UNITED STATES PATENT OFFICE.

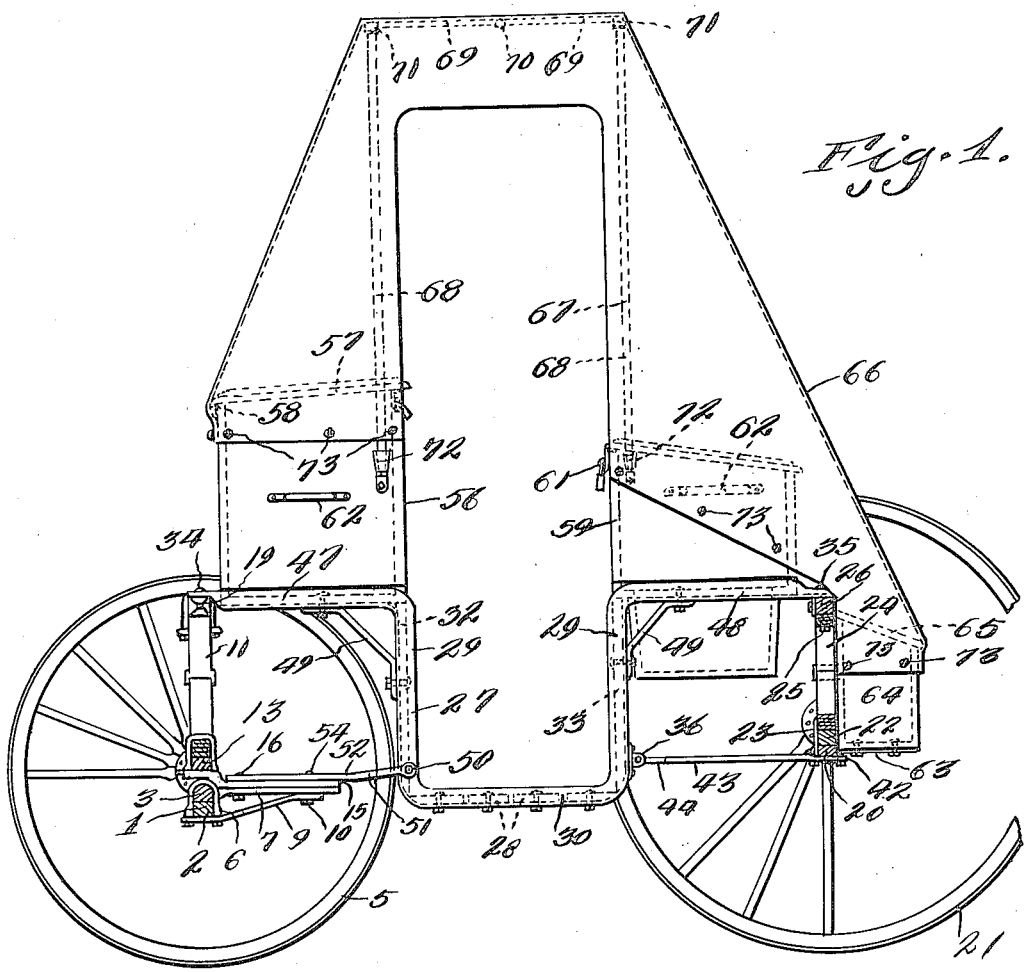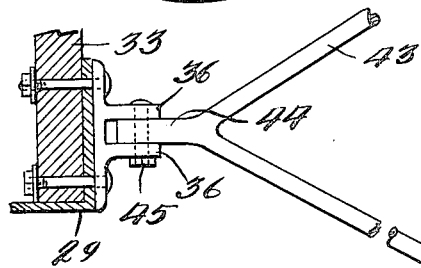

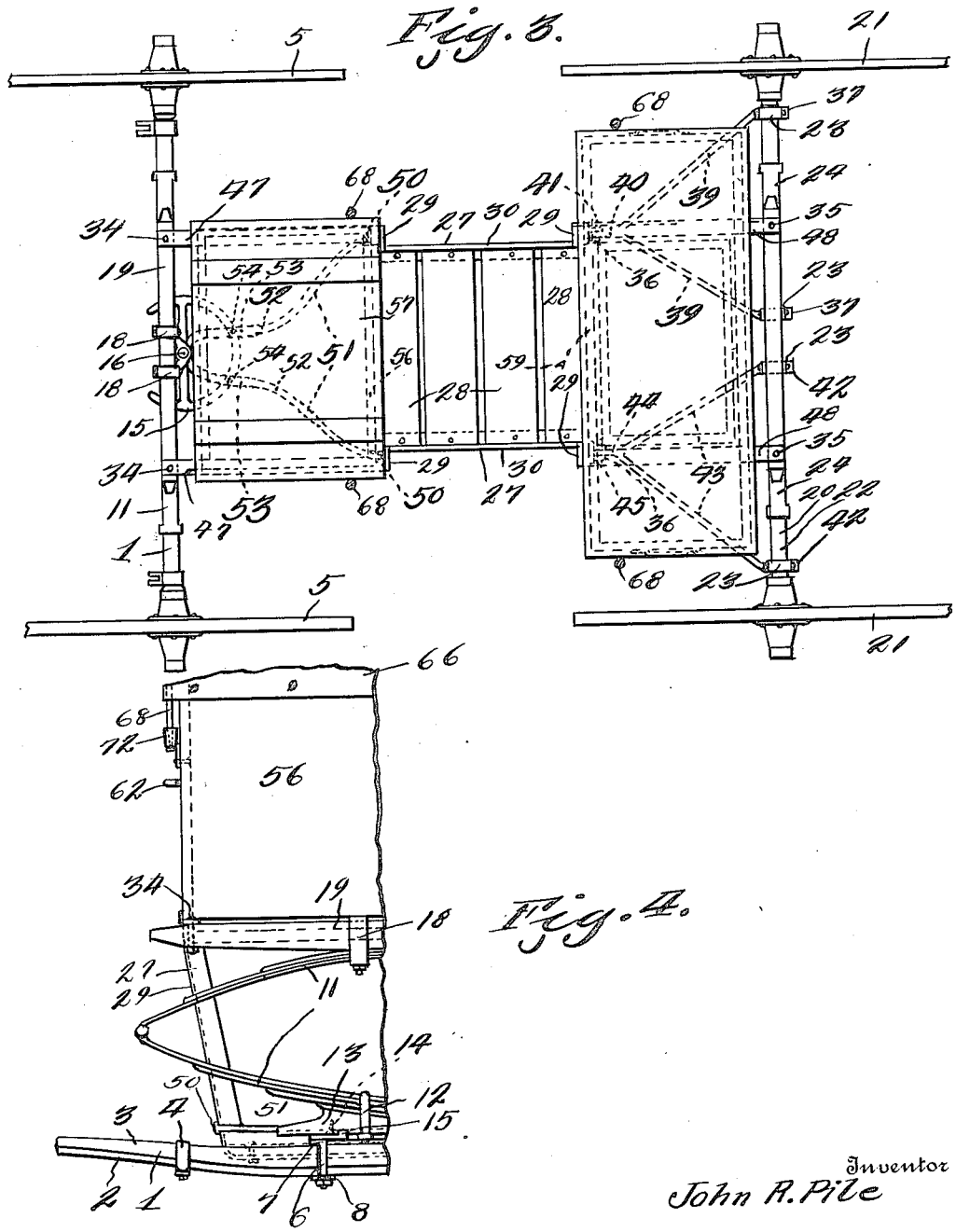

JOHN R. PILE, OF OWENSBORO, KENTUCKY.

MAIL VEHICLE OR WAGON.

1,259,127.　　　　Specification of Letters Patent.　　Patented Mar. 12, 1918.

Application filed March 29, 1916. Serial No. 87,489.

*To all whom it may concern:*

Be it known that I, JOHN R. PILE, a citizen of the United States, residing at Owensboro, in the county of Daviess, State of Kentucky, have invented a new and useful Mail Vehicle or Wagon; and I do hereby declare the following to be a full, clear, and exact description of the invention, such as will enable others skilled in the art to which it appertains to make and use the same.

This invention relates to the art of vehicles, and more particularly to those that are used in distributing mail matter in the suburban and rural districts, and one of the objects of the invention is to provide a vehicle of this kind, which is simple, efficient and practical in construction.

Another object of the invention is to eliminate the usual two wheeled cart, and substitute therefor a mail wagon or vehicle having improved features of construction, as hereinafter set forth.

Another object of the invention is to eliminate the disadvantages of the mail cart, and to provide a four wheel vehicle or mail wagon comprising an angle iron frame mounted upon the front and rear springs of the running gear, to which running gear the frame is connected by a plurality of hinged joints, thus making the frame flexible, thereby accommodating all vibrations, incident to the vehicle traveling over a rough road bed.

Another object of the invention is to provide a vehicle of this kind, the body of which is provided with a narrow portion between the front and rear wheels, thereby permitting the front wheels to turn under the forward part of the body of the vehicle, whereby the same may make sharp turns.

Another object of the invention is to provide a vehicle of this design, which is evenly balanced upon four wheels, and to eliminate all strain upon the animal.

Another object of the invention is to provide removable forward and rear mail boxes, and it will be seen that the rear box can be used as a seat, or may be removed, whereby a seat can be substituted therefor.

One of the features of the invention is the provision of a plurality of uprights having their lower ends engaging the sockets upon the ends of said mail boxes, and having their upper ends connected by hinged sectional braces, said uprights being designed to support a suitable cover, which has snap hook devices, for connecting the cover to the ends of the mail boxes, whereby the cover may be drawn tight into position.

Another object of the invention is the provision of a suitable box at the rear of the vehicle, into which the cover, and the uprights and the connections may be arranged, until required, in case a storm should arise.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in side elevation of the improved mail wagon or vehicle constructed in accordance with the invention.

Fig. 3 is a plan view.

Fig. 4 is a front view of a portion of a mail wagon or vehicle.

Fig. 5 is a plan view of a portion of the clip or brace for the rear axle.

Figure 2:
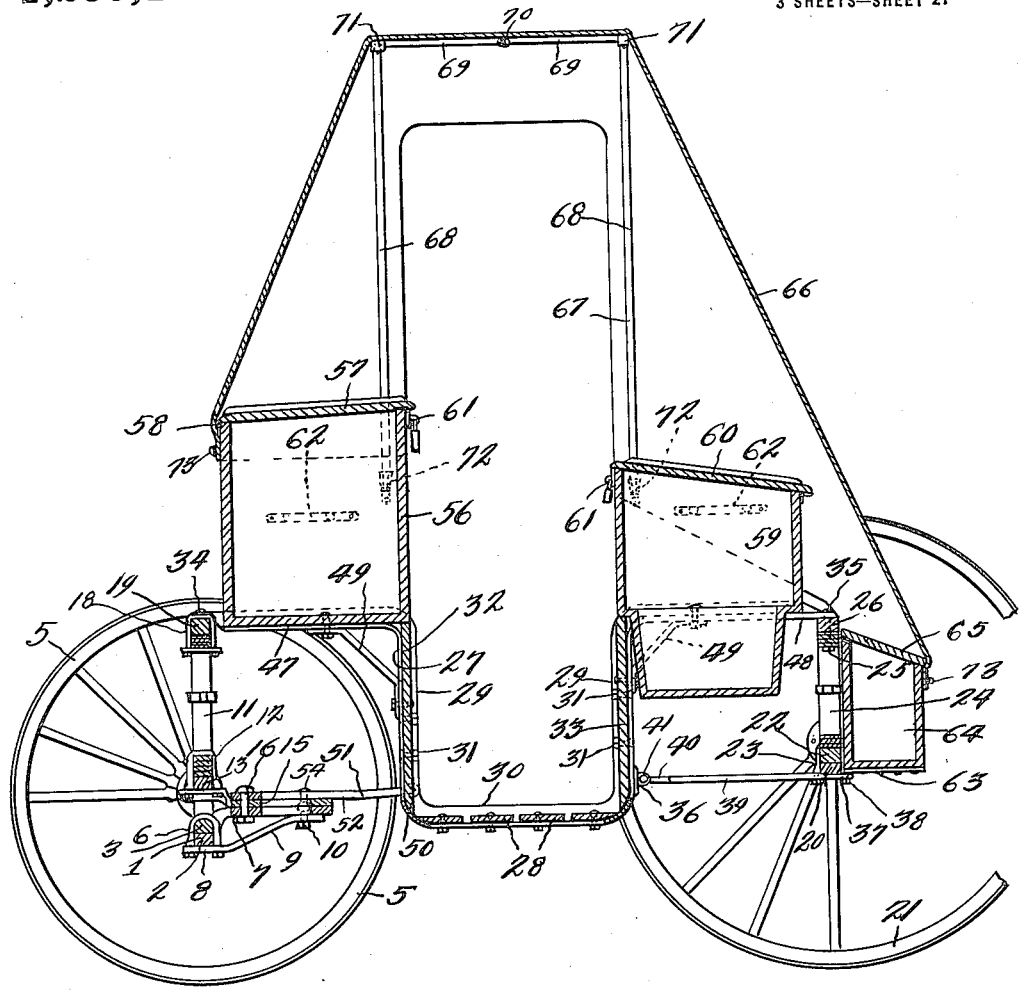
Fig. 2 is a vertical sectional view.

Referring more especially to the drawings, 1 designates the usual front axle of the vehicle, which comprises the usual metal portion 2 and the usual wood part 3, which are held together by the usual clip 4, and upon the ends of the axle 1, that is, upon the ends of the part 2 of the axle the forward supporting wheels 5 are journaled. Formed with the clips 6 is the lower section 7 of the fifth wheel, and the plates 8 through which the clips 6 pass have rear extensions 9, which are bolted or otherwise secured at 10 to the lower section 7 of the fifth wheel, thereby bracing said lower section. The forward supporting spring 11 has secured to it by means of the clips 12 the lower bolster 13, and secured to the bolster 13 by suitable screws 14 is the upper section 15 of the fifth wheel, there being the usual king bolt 16 passing through the upper and lower sections, whereby the lower section may turn relative to the upper section. Fixed to the upper part of the forward supporting spring 11 by means of the clips 18 is the upper bolster 19. The rear axle 20 is provided with the usual rear supporting wheels 21, and secured on the top of the axle is the usual wood section 22, by means of the clips 23. Secured upon the wood section 22 of the rear axle in any suitable manner is the rear supporting spring 24, to the upper part of which by means of the bolts 25, the conventional form of bolster 26 is fixed. The main frame of the body of the vehicle comprises the side angle bars 27, the central portions of which are bent downwardly in U-form, and bolted to the lower portion of the U-form of said bars are transverse boards or the like 28. The vertical verse boards 29 of the U-form portions 30 of said bars have secured thereto by means of bolts 31 front and rear boards 32 and 33, which boards together with the boards 28 provide a supporting structure for the driver. The forward and rear ends of said angle bars 27 are secured at 34 and 35 to the forward and rear bolsters 19 and 26. Carried by the lower portions of the rear vertical part of the U-form portions of said bars 27 are ears 36. Upon reference to Fig. 3 of the drawings it is to be seen that there are four clips 23 for securing the wood section 22 to the axle 20. The plates 37 which are secured to the rear axle by the clips 23 and nuts 38 have extensions 39, which converge toward each other and merge into a single extension 40, which is bolted at 41 to the right hand ears 36. The plates 42 of the left hand U-shaped clips 23 of the rear axle 20 also have extensions 43 which converge toward each other and merge into a single extension 44, which is bolted at 45 to the left hand ear 36, thereby bracing the U formed portions of the angle bars and the rear axle and rear spring relative to each other, and owing to the connections 41 and 45, there is just sufficient flexibility to the structure, to accommodate the vibrations, incident to the vehicle passing over a rough road bed. The upper horizontal portions 47 and 48 of the angle bars are reinforced relative to the vertical parts 29 of the U-form portions, by means of the braces 49. Pivoted at 50 to the lower portions of the forward vertical parts 29 of the U-form portions of the angle bars are the arms 51 of the member 52, the forward contracted end portion 53 of which is so arranged that the king bolts 16 passes through the same. The arms 51 where they cross the upper section 15 of the fifth wheel are bolted or riveted at 54 to the upper section 15 of the fifth wheel. The arms 51 are pivoted to the angle bars forming the frame of the body of the vehicle to insure flexibility, so that the body of the vehicle will accommodate the vibrations incident to the wheels passing over a rough road bed. A suitable box or receptacle 56 for holding mail matter is supported upon the forward upper horizontal portion 47 of the angle bars of the frame, said box or receptacle being provided with a suitable closure 57 hinged at 58. A suitable box or receptacle 59 for the reception of mail matter is supported upon the rear upper horizontal portions 48 of the angle bars of the frame, and is provided with a hinged closure. These mail receptacles or boxes may be provided with a suitable hasp and padlock connection, as shown at 61. The opposite ends of the mail boxes or receptacles are provided with suitable handles 62, whereby the boxes may be removed when desired. However, the rear mail box 59 has its lower portion contracted, as shown. Supported by suitable brackets 63 to the rear of the axle 20 is a suitable box or receptacle 64 having a hinged closure 65, and it is designed to receive the cover or canopy 66 and the supporting structure 67 therefor, that is, when the supporting structure is collapsed and the canopy folded. The supporting structure 67 comprises the uprights 68, to the upper terminals of which the rods 69 (each of which consists of two sections hinged at 70) are fixed as shown at 71. The lower terminals of the uprights 68 are received in the sockets 72 upon the opposite ends of the boxes or mail receptacles 56 and 59. Where the lower edges of the canopy or cover overlie the mail boxes or receptacles, they are fastened to the mail boxes by means of snap buttons 73.

The invention having been set forth, what is claimed as new and useful is:

1. In combination, forward and rear running gears, a drop vehicle body frame, said frame comprising elongated side bars angular in cross section and having their forward and rear ends secured to the forward and rear running gears, said side bars having central U-formed portions, means connecting the U-formed portions, thereby forming said drop frame, a substantially V-shaped brace having its forward end connected to the king pin of the fifth wheel of the forward running gear and the extremities of the arms of said brace being pivotally connected to the lower forward parts of the U-formed portions of the side bars, and a V-shaped radius brace pivotally connected to the rear part of the U-formed portion of each side bar and to the rear running gear.

2. In combination, forward and rear running gears, a vehicle body frame having a drop portion, said frame comprising elongated side bars angular in cross section, said bars having horizontal flanges extending inwardly and toward each other and vertical flanges extending upwardly, said bars having their forward ends connected to the forward running gear, and their rear ends to the rear running gear, mail boxes or receptacles detachably engaging and detachably secured on the horizontal and between the vertical flanges of the corresponding rear and forward portions of the side bars of the frame, thereby bracing the frame, a V-shaped brace between the forward running gear and the drop portion of the frame, and a V-shaped brace connecting the rear part of the drop portion of each side bar and the rear running gear.

3. In combination, forward and rear running gears, a vehicle drop frame body connecting said forward and rear running gears. forward and rear mail receptacles, said frame comprising parallel side angle bars, between the angularly disposed flanges of which, said receptacles are detachably secured, and side U-shaped frames rising upwardly from the sides of said receptacle and being detachably secured thereto to form a cover frame and a canopy stretched over the U-shaped frames, and down toward and secured to the front and rear mail receptacles.

In testimony whereof I have signed my name to this specification in the presence of two subscribing witnesses.

JOHN R. PILE.

Witnesses:
  GROVER C. HILL,
  J. S. WOOLFOLK.